United States Patent [19]

Hansen et al.

[11] Patent Number: 5,576,100

[45] Date of Patent: Nov. 19, 1996

[54] MAGNETO-OPTICAL RECORDING MEDIUM

[75] Inventors: Peter Hansen, Aachen-Walheim; Dieter Mergel; Detlef Raasch, both of Aachen, all of Germany

[73] Assignee: U.S. Philips Corporation, New York, N.Y.

[21] Appl. No.: 266,049

[22] Filed: Jun. 27, 1994

[30] Foreign Application Priority Data

Jul. 1, 1993 [DE] Germany ............... 43 21 851.2

[51] Int. Cl.$^6$ ............... B32B 5/16; G11B 5/66
[52] U.S. Cl. ............... 428/332; 428/336; 428/694; 428/900; 428/694 ML; 428/694 MT; 428/694 RE; 428/694 LE; 428/694 SC; 360/55; 360/114; 369/13; 369/14
[58] Field of Search ............... 428/694 SC, 694 LE, 428/336, 332, 900, 694 ML, 694 MT, 694 RE; 360/55, 114; 369/13, 14

[56] References Cited

U.S. PATENT DOCUMENTS 4,814,053  3/1989  Shimakamato ............... 204/192.15

FOREIGN PATENT DOCUMENTS

| 0023854 | 2/1981 | European Pat. Off. . |
|---|---|---|
| 00289315 | 11/1988 | European Pat. Off. . |
| 0308201 | 3/1989 | European Pat. Off. . |
| 3935698A1 | 5/1990 | Germany . |
| 4219139A1 | 12/1992 | Germany . |
| 47090 | 2/1987 | Japan . |
| 48711 | 11/1987 | Japan . |
| 76134 | 4/1988 | Japan . |
| 262245 | 4/1988 | Japan . |
| 10354 | 6/1988 | Japan . |
| 140058 | 10/1988 | Japan . |
| 164049 | 11/1988 | Japan . |
| 02118066 | 5/1990 | Japan . |
| 02118065 | 5/1990 | Japan . |
| 04325670 | 11/1992 | Japan . |
| 06002131 | 1/1994 | Japan . |
| 9403892 | 2/1994 | WIPO . |

OTHER PUBLICATIONS

Journal of Vacuum Science and Technology: Part A, vol. 1, No. 8, Jan. 1990, New York US, pp. 7–12, XP000117284, Murakami et al, *Preparation of TbFe films by magnetron sputtering* using multiphase target, p. 7, left col., line 1–p. 8, left col. line 2.

*Primary Examiner*—Leszek Kiliman
*Attorney, Agent, or Firm*—Norman N. Spain

[57] ABSTRACT

The invention relates to a magneto-optical recording medium having a magneto-optical layer which is composed of a quaternary alloy of $Nd_xTb_yFe_zCo_m$, the quantitative proportions of the alloying elements x, y, z and m being selected as follows:

x=4–16 at. %
y=20–30 at. %
m=36.5±4.5+x-y at. %
z=100-x-y-m at. %.

11 Claims, No Drawings

MAGNETO-OPTICAL RECORDING MEDIUM

FIELD OF THE INVENTION

The invention relates to a magneto-optical recording medium comprising a magneto-optical layer which is composed of a quaternary alloy of $Nd_xTb_yFe_zCo_m$.

BACKGROUND OF THE INVENTION

In EP-A-023 854 which corresponds substantially to U.S. Pat. No. 5,053,287 a description is given of recording media comprising such quaternary magneto-optical layers in which the proposed quantitative proportions of x and y are 5 to 30 at. % and 10 to 30 at. %, respectively. Further, $x/(z+m)$ should be chosen to be <0.5. Said application does not state how the quantitative proportions of the transition metals (z and m) can be chosen. The magneto-optical layers manufactured according to the specifications given in said document include layers having completely useless properties. During reading of the stored information, also the exemplary compositions described in EP-A-0324 854 yield signal-to-noise ratios (SNRs) which are too low.

Information can be stored in magneto-optical recording media. To this end, a suitable pattern of magnetized areas is written in the hard-magnetic magneto-optical layer which is anisotropic in the direction perpendicular to said layer. For this purpose, the relevant areas are heated to a temperature within the Curie-temperature range by a laser beam, so that, due to the reduction of the coercive force, a weak magnetic field suffices to reverse the magnetization in accordance with the information to be written. The stored information can be read on the basis of the polar magneto-optical Kerr effect. The plane of polarization of the reflected portion of the polarized laser light emitted for reading is rotated in a clockwise or anticlockwise direction, dependent on the direction of magnetization.

A magneto-optical record carrier comprises a substrate layer. A photo-polymerization lacquer is sprayed, for example, onto a glass substrate. A groove pattern is mechanically formed in said lacquer layer which is subsequently cured by exposure to UV light. The magneto-optical layer is applied to a dielectric layer (for example aluminium-nitride or silicon nitride) which is present on the lacquer layer. Said dielectric layer is used for matching the refractive indices of the substrate and the magneto-optical layer. Finally, a reflective Al layer is provided. Alternatively, a synthetic resin substrate can be used instead of a lacquer-coated glass substrate.

The selection of the alloying elements of a magneto-optical layer and the quantitative proportion of said elements should be such that, in particular, the following requirements are met:

- a uniaxial anisotropy which extends perpendicularly to the layer, so that the information can be read on the basis of the Kerr effect,
- a high magneto-optical effect even when the laser power is limited,
- the Curie temperature $T_c$ should be in the range from 400K to 600K, so that stable areas are obtained from which information can be read with a high signal-to-noise ratio,
- a high coercive force and low magnetization at the temperatures at which reading takes place.

A fundamental criterion of the quality of a magneto-optical layer is, of course, the signal-to-noise ratio (SNR) during reading of the stored information. In general, the signal-to-noise ratios are governed by the wavelength of the laser light used for reading. In state-of-the-art recording media, high signal-to-noise ratios can only be attained at specific, predetermined wavelengths of the reading light.

The measured signal-to-noise ratios are also governed by the bandwidth of the frequency interval around the frequency which is to be measured and at which the magneto-optical signal is detected.

A further criterion is the compensation temperature $T_{Comp}$ at which the magnetic moments of the different alloying elements of the ferrimagnetic, magneto-optical layer compensate to zero at a specific temperature (saturation magnetization=zero).

The value of $T_{Comp}$ and $T_C$ (Curie temperature) ($T_{Comp}<T_C$) can be used to roughly estimate the quality of a magneto-optical layer. The maximum saturation magnetization which is attained between both temperatures is approximately proportional to the difference between said temperatures. The coercive field strengths $H_C$ produced in the range between said temperatures during the thermomagnetic switching process are also governed by $T_{Comp}$ which may change considerably as a result of small differences in the composition of the alloying elements.

SUMMARY OF THE INVENTION

An object of the invention is to provide a magneto-optical recording medium of the type mentioned in the opening paragraph, which comprises a magneto-optical layer which exhibits satisfactory operating properties, in particular a high signal-to-noise ratio, both during writing and reading of the information. Said favorable operating properties should be substantially independent of the wavelength of the laser light used for reading.

DETAILED DESCRIPTION OF THE PREFERRED EMBODIMENTS

This object is achieved in that the quantitative proportions of the alloying elements x, y, z and m are selected as follows:

x=4–16 at. %
y=20–30 at. %
m=36.5±4.5+x-y at. %
z=100-x-y-m at. %.

In addition, the corrosion stability of the four-element alloy can be increased, for example, by adding metallic elements, such as Cr, Ti, Nb in a quantity up to several %.

To achieve the above object, it is preferred to meet the following conditions:

$x/(z+m)<0.26$ and/or
30 at. % $\leq z \leq$ 55 at. %.

In especially preferred embodiments, the magneto-optical layer thicknesses are in the range from 30 to 80 nm.

For values of x<4 at. % (Nd content), reading by means of visible light leads to signal-to-noise ratios (SNR) which are too low. For values of x>16%, light of any wavelength results in signal-to-noise ratios which are too low. For values of x>25%, information can no longer be written.

Also for values of y<20% (Tb content) the signal-to-noise ratios obtained are too low. For values of y>30%, the compensation temperature $T_{Comp}$ is too low.

Outside the range 6 at. %<m<37 at. % (Co content) no useful Curie temperatures $T_C$ are found. If m is too high, also $T_C$ is too high. This results in too low a thermal sensitivity of the magneto-optical layer, so that the laser powers necessary for writing would be too high.

A low Curie temperature associated with too low a value of m causes magneto-optical signals which are too weak at the reading temperature. In addition, the information-containing areas become unstable.

Values for $x/(z+m)<0.26$ are advantageous, in particular, if high signal-to-noise ratios are desired in the readout wavelength range 400 nm $\leq \lambda \leq$ 820 nm. If the values are too high, in particular if $x/(z+m)>0.35$, information can no longer be reliably written due to too low a Curie temperature.

Magneto-optical recording media in accordance with the invention can be reliably read with laser light in the wavelength range from visible light to IR radiation.

Table 1 below lists the compositions of 25 different samples and associated measuring results for $T_{Comp}$, $T_C$ and SNR at the reading-light wavelengths 820 nm, 647 nm and 458 nm. Samples 1 to 11 relate to inventive alloys of this invention. The compositions of the comparative samples 12 to 25 fall outside the range in accordance with the invention.

The external magnetic field strengths $H_{ext}$ used for writing and erasing were optimized in the range 16 kA/m $\leq H_{ext} \leq$ 40 kA/m with a view to obtaining maximum signal-to-noise ratios. During reading, recorder data in accordance with Table 2 were used. The symbols used have the following meaning:

NA: numerical aperture of the read laser $V_r$: linear velocity of the magneto-optical disc $f_{pulse}$: pulse repetition frequency of the laser beam $t_{pulse}$: pulse duration $P_r$: laser power The reflected signal was detected with a bandwidth of 30 kHz.

The samples 19 to 25 are unsuitable for use in magneto-optical recording media because it is impossible to store a readable signal.

Using the samples 12 to 18, even at a reading light wavelength of 820 nm, signal-to-noise ratios>50 dB could not be attained.

Using the samples 1 to 11 in accordance with the invention, advantageous combinations of $T_{Comp}$ and $T_C$ and hence signal-to-noise ratios >50 were attained, at least when reading light having a relatively high wavelength was used. Even at relatively short wavelengths of approximately 458 nm, exceptionally high signal-to-noise ratios were attained.

Using only one magneto-optical layer of known alloys, it would have been impossible to attain high signal-to-noise ratios in such a wide wavelength range of the reading light. In magneto-optical recording media in accordance with the invention, information can be recorded so as to be lasting by using a laser having a relatively low power. The recorded information can be read reliably and with little noise, using light of any wavelength in the range from visible light to IR radiation.

TABLE 1

| Sample No. | Composition | $T_{comp}$ (K) | $T_c$ (K) | SNR (dB) 820 nm | 647 nm | 458 nm |
|---|---|---|---|---|---|---|
| 1 | $Tb_{23.7}Nd_{6.7}Fe_{51.7}Co_{17.9}$ | 320 | 510 | 55.2 | 55.0 | 49.0 |
| 2 | $Tb_{29.2}Nd_{8.7}Fe_{41.8}Co_{20.3}$ | 395 | 510 | 53.9 | | |
| 3 | $Tb_{28.5}Nd_{9.6}Fe_{40.2}Co_{21.7}$ | 355 | 500 | 54.5 | 55.0 | 47.5 |

TABLE 1-continued

| Sample No. | Composition | $T_{comp}$ (K) | $T_c$ (K) | SNR (dB) 820 nm | 647 nm | 458 nm |
|---|---|---|---|---|---|---|
| 4 | $Tb_{28.3}Nd_{11.0}Fe_{39.6}Co_{21.1}$ | 365 | 490 | 54.0 | 53.9 | 47.5 |
| 5 | $Tb_{28.3}Nd_{8.5}Fe_{46.7}Co_{16.5}$ | 350 | 460 | 53.1 | | |
| 6 | $Tb_{28.0}Nd_{10.9}Fe_{45.2}Co_{15.9}$ | 335 | 430 | 53.3 | | |
| 7 | $Tb_{27.5}Nd_{9.5}Fe_{46.9}Co_{16.1}$ | 325 | 450 | 51.9 | | |
| 8 | $Tb_{21.4}Nd_{14.9}Fe_{38.2}Co_{25.5}$ | 235 | 490 | 50.9 | | |
| 9 | $Tb_{22.6}Nd_{15.4}Fe_{31.9}Co_{30.1}$ | 300 | 450 | 52.1 | | |
| 10 | $Tb_{22.1}Nd_{15.7}Fe_{31.8}Co_{30.4}$ | 290 | 500 | 52.7 | | 46.5 |
| 11 | $Tb_{22.8}Nd_{15.3}Fe_{31.9}Co_{30.0}$ | 320 | 470 | 51.8 | | |
| 12 | $Tb_{27.9}Nd_{15.2}Fe_{19.3}Co_{37.6}$ | | | 35.7 | | |
| 13 | $Tb_{26.6}Nd_{15.1}Fe_{19.9}Co_{38.4}$ | | | 41.6 | | |
| 14 | $Tb_{13.9}Nd_{19.5}Fe_{47.3}Co_{19.3}$ | 40 | 500 | 44.7 | | |
| 15 | $Tb_{17.4}Nd_{19.4}Fe_{45.2}Co_{18.0}$ | 210 | 445 | 48.3 | | |
| 16 | $Tb_{21.8}Nd_{18.9}Fe_{41.6}Co_{17.7}$ | 280 | 380 | 43.3 | | |
| 17 | $Tb_{14.0}Nd_{23.0}Fe_{44.5}Co_{18.5}$ | 160 | 420 | 44.5 | | |
| 18 | $Tb_{17.4}Nd_{22.6}Fe_{41.4}Co_{18.6}$ | 220 | 370 | 26.5 | | |
| 19 | $Tb_{21.4}Nd_{23.0}Fe_{37.7}Co_{17.9}$ | >$T_c$ | 320 | 0.0 | | |
| 20 | $Tb_{13.1}Nd_{27.7}Fe_{43.3}Co_{15.9}$ | | | 0.0 | | |
| 21 | $Tb_{16.7}Nd_{27.5}Fe_{40.8}Co_{15.0}$ | | | 0.0 | | |
| 22 | $Tb_{20.6}Nd_{27.3}Fe_{37.7}Co_{14.4}$ | | | 0.0 | | |
| 23 | $Tb_{13.1}Nd_{30.8}Fe_{40.3}Co_{15.8}$ | | 320 | 0.0 | | |
| 24 | $Tb_{17.1}Nd_{30.7}Fe_{37.1}Co_{15.1}$ | | 275 | 0.0 | | |
| 25 | $Tb_{20.5}Nd_{31.4}Fe_{34.0}Co_{14.1}$ | | <250 | 0.0 | | |

TABLE 2

| | Wavelength of reading light | | |
|---|---|---|---|
| | 820 nm | 647 nm | 458 nm |
| NA | 0.52 | 0.52 | 0.60 |
| $V_r$ | 5.0 m/s | 5.0 m/s | 5.0 m/s |
| $f_{pula}$ | 2.1 MHz | 2.1 MHz | 2.0 MHz |
| $t_{pula}$ | 50 ns | 40 ns | 200 ns |
| $P_r$ | 1.5 mW | 1.5 mW | 1.05 mW |

We claim:

1. A magneto-optical recording medium comprising a magneto-optical layer which is composed of a quaternary alloy of $Nd_xTb_yFe_zCo_m$, the quantitative proportions of the alloying elements x, y, z and m being selected as follows:

x=4–16 at. % y=20–30 at. % m=37.5±4.5+x-y at. % z=100-x-y-m at. %.

2. A recording medium as claimed in claim 1, wherein $x/(z+m)<0.26$.

3. A recording medium as claimed in claim 1, wherein 30 at. %<z$\leq$55 at. %.

4. A recording medium as claimed in claim 1, wherein the thickness of the magneto-optical layer is 30 to 80 nm.

5. At least one of recording or playback devices or combination of the same comprising a recording laser, a reading laser or both for use at wavelengths in the range from approximately 820 nm to 450 nm, each of said devices also comprising a recording medium of claim 1.

6. A recording medium as claimed inn claim 2 wherein 30 at. %<z$\leq$55 at. %.

7. A recording medium as claimed in claim 2 wherein the thickness of the magneto-optical layer is 30 to 80 nm.

8. At least one of recording or playback devices or combination of the same comprising a recording laser, a reading laser or both for use at wavelengths in the range from approximately 820 nm to 450 nm, each of said devices also comprising a recording medium of claim 2.

9. A recording medium as claimed in claim 3 wherein the thickness of the magneto-optical layer is 30 to 80 nm.

10. At least one of recording or playback devices or combination of the same comprising a recording laser, a reading laser or both for use at wavelengths in the range from approximately 820 nm to 450 nm, each of said devices also comprising a recording medium of claim 3.

11. At least one of recording or playback devices or combination of the same comprising a recording laser, a reading laser or both for use at wavelengths in the range from approximately 820 nm to 450 nm, each of said devices also comprising a recording medium of claim 4.

* * * * *